Sept. 20, 1927.

M. SHAPIRO 1,643,093

EGG TESTING DEVICE

Filed May 18, 1926

Inventor
MAX SHAPIRO
By Attorney
Aaron L. Applebaum.

Patented Sept. 20, 1927.

1,643,093

UNITED STATES PATENT OFFICE.

MAX SHAPIRO, OF NEW YORK, N. Y.

EGG-TESTING DEVICE.

Application filed May 18, 1926. Serial No. 110,011.

This invention relates to egg testing devices and more particularly to a novel and improved casing in which a light, preferably an incandescent lamp may be positioned, so that the rays may be directed through the egg shell and the condition of the egg yoke determined.

One of the objects of my invention is to provide an egg testing device wherein an enclosed casing or housing is adapted to receive a suitable light such as an incandescent lamp, located below a movable partition or support having an opening on which the egg to be tested is positioned, including an observation opening and hood whereby the condition of the egg yolk may be determined by means of the light rays penetrating the egg shell.

Another object of my invention is to construct and provide an electric egg testing device in which the egg to be tested is positioned above a light or incandescent lamp, including provision for rotating the egg whereby the light penetrating rays passing through the shell will permit of total observation of the egg yolk whereby its condition may be determined.

Another object of my invention is to provide a novel and improved casing in an egg testing device having a top enclosure formed integral with an observation hood, which is simple in construction, comprising but very few parts that may be easily assembled, highly efficient in operation and use, practical, durable, ornamental and otherwise capable of being manufactured of different grades of material and at a very low cost.

Figure 1:
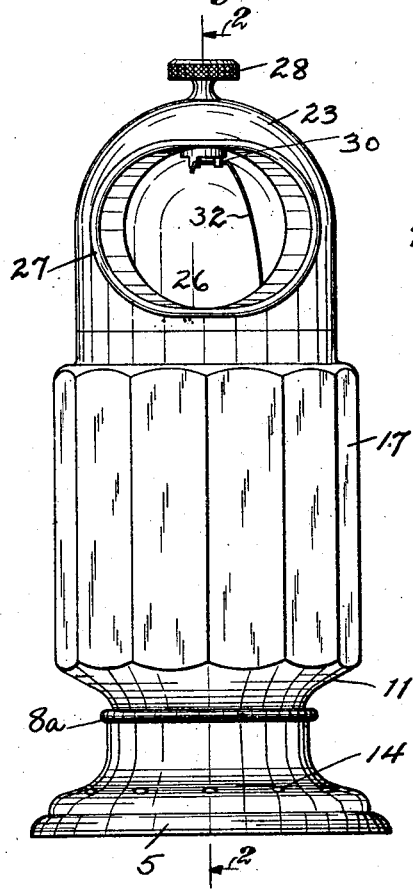

In order to more fully understand and appreciate my invention, reference is had to the accompanying drawing showing a preferred embodiment thereof in which Fig. 1 is a front view showing my egg testing device.

Figure 2:
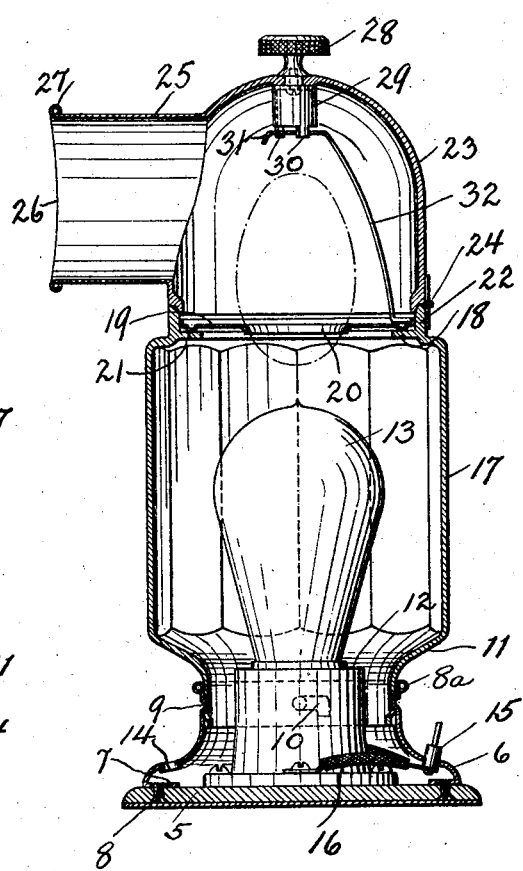

Fig. 2 is a vertical section taken on the line 2—2 of Fig. 1.

Referring now to the drawings wherein like reference numerals designate corresponding parts throughout the several views, 5 designates an annular, insulated base of any suitable material to which there is attached a socket receptacle or hollow ring 6, the flange 7 of which is secured by suitable screws 8 or other fastening elements. The receptacle or ring 6 may be stamped from any suitable material preferably light metal, being curved inwardly and upwardly toward its top which is formed with a rolled bead $8^a$. Below the rolled bead and at spaced intervals, the metal is bent inwardly or notched as at 9 to engage and enter the bayonet slots 10 of a hollow shell 11, the socket being attached to or formed integral with the base 5 as manufacturing necessities or requirements may demand. The top 12 of the socket extends slightly above the top of the bead of the ring 6 and is adapted to receive the usual type of incandescent lamp 13. The ring 6 is also provided with a series of openings 14 for ventilating the interior of the egg tester, permitting the escape of heat generated by the lamp. A socket 15 and conductors 16 leading to contacts of the socket are provided so that the device may be conveniently attached and connected to a wall socket in the well known manner.

The body portion 17 of the hollow shell may be of any desired shape and for the purpose of ornamentation, I have shown it polygonal with its lower portion somewhat restricted in diameter so that it will snugly fit into the top of the receptacle or hollow ring 6 and be securely connected therewith by a slight rotation whereupon the notches may enter the bayonet slots, above referred to.

The top of the hollow shell is open being formed with a ledge or shoulder 18 on which there is mounted and positioned a flat disk 19 having a central opening 20 on which the egg to be tested may be placed, end on end. The disk is provided with an annular depressed portion 21 to permit its easy rotation in the manner further to be described.

Connected to the top extension 22 of the hollow shell is a dome shaped closure 23, hingedly connected as at 24 to the rear wall and formed integral therewith is an observation hood 25 with an eliptical front opening 26, the edge 27 of the front opening being rolled outwardly forming a bead or beveled edge. It will be observed that the observation opening is in direct line with the egg shown in dotted lines, to be tested and that the latter is directly above the lamp so that the light penetrating rays may pass therethrough and the condition of the egg be observed. The interior or the shell and dome shaped closure may be covered or coated with lamp black or other light absorbing coating for the purpose well understood.

In order to permit the total observation of the egg being tested and permit the rotation of the disk 19, I have provided a rotating knob 28 in the top of the closure, said knob having a socket portion 29 and opposed lugs 30 adapted to engage the bent extension 31 of a strip of wire 32, the lower end of which is permanently attached or connected to the disk 19 adjacent its periphery. Consequently, upon the rotation of the knob, as the lugs engage the extension 31, when rotated in either direction, the wire strip will be similarly rotated and the disk revolved. In this manner when the egg is positioned on the disk and observed through the front opening of the hood, its yolk may be determined by reason of the light penetrating rays from the incandescent lamp. The hood may be easily and conveniently raised by reason of the hinged connection to permit another egg to be replaced in which instance the strip of wire attached to the disk is not moved by the socket of the turning knob.

Having shown and described my invention, what I now claim as new and desire to secure by Letters Patent of the U. S. is:

1. An egg testing device comprising a base, a lamp socket supported on said base, a shell detachably connected and adapted to be locked to said base, said shell being open at its top and having a shoulder adjacent thereto, a rotatable egg supporting disk on the shoulder, a hinged closure connected to the shell, said closure having a front observation opening, a rotatable knob on the top of the closure and means engaged by said knob and connected to the disk whereby said disk and an egg supported thereon may be rotated.

2. An egg testing device comprising a base having ventilating openings therein, a lamp socket on said base, a cylindrical shell connected to and adapted to be locked to said base, said shell being open at its top and having a shoulder adjacent thereto, a rotatable egg supporting disk on the shoulder, a dome-shaped closure hingedly connected to the shell, said closure having a front observation opening, a rotatable knob on the top of the closure, lugs on the bottom of the knob and a bent wire connected at one end to the disk and having its free end in the path of movement of the said lugs whereby the disk may be rotated.

In testimony whereof I affix my signature.

MAX SHAPIRO.